(12) United States Patent
Liu et al.

(10) Patent No.: US 11,867,595 B2
(45) Date of Patent: Jan. 9, 2024

(54) X-RAY REFLECTOMETRY APPARATUS AND METHOD THEREOF FOR MEASURING THREE DIMENSIONAL NANOSTRUCTURES ON FLAT SUBSTRATE

(71) Applicant: INDUSTRIAL TECHNOLOGY RESEARCH INSTITUTE, Hsinchu (TW)

(72) Inventors: Chun-Ting Liu, Taichung (TW); Wen-Li Wu, Hsinchu (TW); Bo-Ching He, Hsinchu (TW); Guo-Dung Chen, New Taipei (TW); Sheng-Hsun Wu, Zhubei (TW); Wei-En Fu, Taoyuan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 26 days.

(21) Appl. No.: 17/532,767

(22) Filed: Nov. 22, 2021

(65) Prior Publication Data
US 2022/0120561 A1 Apr. 21, 2022

Related U.S. Application Data

(63) Continuation-in-part of application No. 17/037,115, filed on Sep. 29, 2020, now Pat. No. 11,579,099.
(Continued)

(30) Foreign Application Priority Data

Jul. 14, 2020 (TW) ................................. 109123688

(51) Int. Cl.
*G01N 23/20* (2018.01)
*G01N 23/20008* (2018.01)

(52) U.S. Cl.
CPC ....... *G01N 23/20* (2013.01); *G01N 23/20008* (2013.01); *G01N 2223/051* (2013.01);
(Continued)

(58) Field of Classification Search
None
See application file for complete search history.

(56) References Cited

U.S. PATENT DOCUMENTS

| 6,771,735 B2 | 8/2004 | Janik et al. |
| 6,987,832 B2 | 1/2006 | Koppel et al. |

(Continued)

FOREIGN PATENT DOCUMENTS

| CN | 104081193 B | 9/2017 |
| CN | 110038284 A | 7/2019 |

(Continued)

OTHER PUBLICATIONS

Voegeli, et al. "A quick convergent-beam laboratory X-ray reflectometer using a simultaneous multiple-angle dispersive geometry" J. Appl. Cryst. (2017). 50, p. 570-575 (Year: 2017).*
(Continued)

*Primary Examiner* — Thomas R Artman
(74) *Attorney, Agent, or Firm* — Birch, Stewart, Kolasch & Birch, LLP

(57) ABSTRACT

This disclosure relates to an apparatus and methods for applying X-ray reflectometry (XRR) in characterizing three dimensional nanostructures supported on a flat substrate with a miniscule sampling area and a thickness in nanometers. In particular, this disclosure is targeted for addressing the difficulties encountered when XRR is applied to samples with intricate nanostructures along all three directions, e.g. arrays of nanostructured poles or shafts. Convergent X-ray with long wavelength, greater than that from a copper anode of 0.154 nm and less than twice of the characteristic dimen-
(Continued)

sions along the film thickness direction, is preferably used with appropriate collimations on both incident and detection arms to enable the XRR for measurements of samples with limited sample area and scattering volumes. In one embodiment, the incident angle of the long-wavelength focused X-ray is ≥24°, and the sample area is ≤25 µm×25 µm.

16 Claims, 9 Drawing Sheets

Related U.S. Application Data

(60) Provisional application No. 62/914,567, filed on Oct. 14, 2019.

(52) U.S. Cl.
CPC .......... *G01N 2223/052* (2013.01); *G01N 2223/1003* (2013.01); *G01N 2223/1016* (2013.01); *G01N 2223/315* (2013.01); *G01N 2223/611* (2013.01)

(56) References Cited

U.S. PATENT DOCUMENTS

| | | | |
|---|---|---|---|
| 7,139,365 B1 | 11/2006 | Janik | |
| 7,558,371 B2 | 7/2009 | Park et al. | |
| 8,731,138 B2 | 5/2014 | Yokhin et al. | |
| 9,588,066 B2 | 3/2017 | Pois et al. | |
| 9,823,203 B2 | 11/2017 | Yun et al. | |
| 10,119,925 B2 | 11/2018 | Pois et al. | |
| 10,133,192 B2* | 11/2018 | Tinnemans | G01N 21/956 |
| 10,151,713 B2 | 12/2018 | Wu et al. | |
| 10,352,695 B2* | 7/2019 | Dziura | G01N 23/201 |
| 10,727,142 B2* | 7/2020 | Gellineau | G03F 7/70616 |
| 10,767,978 B2* | 9/2020 | Shchegrov | G01N 23/02 |
| 10,775,323 B2* | 9/2020 | Gellineau | G06T 7/60 |
| 10,801,953 B2* | 10/2020 | Wang | G01N 21/9501 |
| 10,859,518 B2* | 12/2020 | Artemiev | G01N 23/201 |
| 11,036,898 B2 | 6/2021 | Chouaib et al. | |
| 11,181,489 B2 | 11/2021 | Thompson et al. | |
| 11,333,621 B2 | 5/2022 | Wack et al. | |
| 11,480,418 B2 | 10/2022 | Kuznetsov et al. | |
| 11,519,719 B2 | 12/2022 | Shchegrov et al. | |
| 11,579,099 B2* | 2/2023 | Liu | G01N 23/2273 |
| 2003/0086533 A1 | 5/2003 | Janik et al. | |
| 2005/0195941 A1 | 9/2005 | Lischka et al. | |
| 2012/0140889 A1 | 6/2012 | Wall et al. | |
| 2015/0204802 A1 | 7/2015 | Pois et al. | |
| 2016/0077025 A1 | 3/2016 | Zhang et al. | |
| 2016/0178540 A1 | 6/2016 | Yun et al. | |
| 2016/0341674 A1 | 11/2016 | Wu et al. | |
| 2017/0167862 A1 | 6/2017 | Dziura et al. | |
| 2017/0176354 A1 | 6/2017 | Pois et al. | |
| 2017/0307548 A1 | 10/2017 | Bykanov et al. | |
| 2017/0315055 A1 | 11/2017 | Tinnemans et al. | |
| 2018/0106735 A1 | 4/2018 | Gellineau et al. | |
| 2018/0188192 A1 | 7/2018 | Artemiev et al. | |
| 2018/0299259 A1 | 10/2018 | Shchegrov et al. | |
| 2018/0350699 A1 | 12/2018 | Gellineau et al. | |
| 2019/0017946 A1 | 1/2019 | Wack et al. | |
| 2019/0286787 A1 | 9/2019 | Chouaib et al. | |
| 2020/0041426 A1* | 2/2020 | Thompson | G01N 23/201 |
| 2020/0225151 A1 | 7/2020 | Wang et al. | |
| 2021/0063329 A1 | 3/2021 | Kuznetsov et al. | |
| 2021/0088325 A1* | 3/2021 | Shchegrov | G01N 21/4785 |
| 2021/0109042 A1* | 4/2021 | Liu | G01N 23/2206 |
| 2021/0239629 A1 | 8/2021 | Chuang et al. | |
| 2021/0310968 A1 | 10/2021 | Kuznetsov et al. | |
| 2022/0120561 A1* | 4/2022 | Liu | G01N 23/20 |
| 2022/0252395 A1 | 8/2022 | Hench et al. | |

FOREIGN PATENT DOCUMENTS

| | | | | |
|---|---|---|---|---|
| EP | 2 443 651 B1 | | 8/2015 | |
| FR | 2180647 A | * | 1/1974 | ....... G01N 23/20008 |
| IT | 201917348 A | | 5/2019 | |
| JP | 2012-13659 A | | 1/2012 | |
| JP | 5504502 B2 | | 5/2014 | |
| TW | 201011278 A | | 3/2010 | |
| TW | I444589 B | | 7/2014 | |
| TW | 201602514 A | | 1/2016 | |
| TW | I660154 B | | 5/2019 | |
| TW | 201946175 A | | 12/2019 | |
| TW | I689702 B | | 4/2020 | |
| TW | 202118992 A | | 5/2021 | |
| TW | 202124941 A | | 7/2021 | |
| TW | 202203281 A | | 1/2022 | |
| WO | WO 2017/203406 A1 | | 11/2017 | |

OTHER PUBLICATIONS

International Search Report and Written Opinion of the International Searching Authority for International Application No. PCT/US22/80122, dated Feb. 14, 2023.

U.S. Office Action for U.S. Appl. No. 17/037,115, dated Jul. 14, 2022.

Taiwanese Office Action and Search Report for Taiwanese Application No. 111134541, dated Feb. 16, 2023.

Freychet et al., "Estimation of Line Cross Sections Using Critical-Dimension Grazing-Incidence Small-Angle X-Ray Scattering", Physical Review Applied 12, 044026, 2019, pp. 044026-1-044026-8.

Lee et al., "Nanoimprint pattern transfer quality from specular x-ray reflectivity", Applied Physics Letters 87, 263111, 2005, pp. 263111-1-263111-3.

Lee et al., "X-ray Reflectivity Measurements of Nanoscale Structures: Limits of the Effective Medium Approximation", AIP Conference Proceedings 931, 209, 2007, pp. 209-215.

Gin et al., "Inline Metrology of High Aspect Ratio Hole Tilt using Small-Angle X-ray Scattering", Proceedings of Spie, vol. 12053, 2022, pp. 1205312-1-1205312-10.

Leng et al., "Rapid x-ray reflectivity (XRR) characterization and process monitoring of multilayer Ta/Al2O3/Ta/SiO2/Si", Proceedings of Spie, vol. 4449, 2001, pp. 244-252.

Taiwanese Office Action and Search Report dated Oct. 23, 2023 for Application No. 112119892.

* cited by examiner

X-RAY REFLECTOMETRY APPARATUS AND METHOD THEREOF FOR MEASURING THREE DIMENSIONAL NANOSTRUCTURES ON FLAT SUBSTRATE

This application is a continuation-in-part application of U.S. application Ser. No. 17/037,115, filed Sep. 29, 2020, which claims the benefits of U.S. provisional application Ser. No. 62/914,567, filed Oct. 14, 2019 and Taiwan application Serial No. 109123688, filed Jul. 14, 2020, the disclosures of which are incorporated by reference herein in its entirety.

TECHNICAL FIELD

The disclosure relates in general to measuring device, and more particularly to an X-ray reflectometry (XRR) apparatus and a method thereof for measuring three dimensional nanostructures on a flat substrate.

BACKGROUND

XRR is a powerful technique to investigate surfaces and interfaces including their roughness, diffuseness across buried layers and thickness of single layer and multilayer stacks by depth profiling the electron density in the direction normal to the sample surface with a sub-nanometer resolution. It has also been shown that XRR is capable of quantifying the cross section profile of surface patterns, for example, the cross section of line gratings fabricated by nanoimprint as well as the molds used to imprint the patterns. The efficacy and the limit of the application of XRR to nanoscale surface patterns are based on the effective medium approximation (EMA) as illustrated previously. It should be noted that the equivalent concept of EMA has been used in estimating effective refractive index of porous material for ellipsometry or scatterometry. The validity of EMA for nanostructures depends on the coherence length of the incident X-ray; EMA becomes applicable when the coherence length is greater than the lateral characteristic length of the nanostructure along the direction of interest. In such cases, the structure space ratio at any given depth along the surface normal can be deduced from the XRR results. In summary, XRR can be used to measure film thickness as well as the cross sectional shape of arrays of line gratings when the incidence X-ray possesses sufficient effective coherence length along the direction of interest. For this reason the line grating is placed with the line along the incident slit width direction or the x-axis, the x-axis is also the detector slit width direction. The slit opening size is typically smaller than the slit width by a few orders of magnitude. In specular XRR geometry, the effective coherence length along the y-axis can be in micrometers whereas in nanometer along the x-axis. For line gratings there is little, if any, structure variations along the x-axis, the above is not true for 3D nanostructures, i.e. a preferred azimuthal orientation does not exist for 3D nanostructured samples. In addition to the challenge in terms of the lateral coherence length on the XRR measurements of nanostructures on a flat substrate, there is also an issue of spill-over of the off-specular scattering intensity into the measured specular reflectivity using convergent beam geometry with a large slit width. Off-specular intensities can reach a magnitude comparable to the specular component in the high Qz regions in samples with significant lateral structures such as the 3D nanostructures discussed herein.

The patents from the NOVA and KLA also discuss the art of reflective X-ray scattering. The one published in 2018 by NOVA (U.S. Pat. No. 10,119,925 B2) is using the conical light source, and its scattering angle is 20 to 40 degrees. It is different from the light source used in present application. The method developed by NOVA can only obtain a scatter pattern on the entire 2D detector screen. A lot of off-specular information will overlap on the screen and it will be very difficult to analyze and distinguish. One solution of NOVA try to propose is using different azimuthal angles to separate the chaotic multi-angle scatter pattern. But there is still lack of results and practical method to obtain the light intensity information in each xyz direction which makes it impossible to analyze the complex 3D structure.

The patent published by KLA in 2019 (US patent 2019/0017946 A1) proposes that different focusing optical elements can be used to produce focus beams with different wavelengths, for example, using a multi-layer coating on a focusing optical lens to focus beams of different wavelengths on the sample. However, the focus beam will still encounter multiple scatterings in the xyz directions at the same time, and it will not be able to analyze and calculate. It also does not describe how to accurately strike the light on the sample at different wavelengths in KLA patent. On the contrary, the long-wavelength light source described in previous invention (US patent 2016/0341674 A1) can be effectively focused on a sample through a monochomator and a slit in the z direction.

In addition, The KLA patent mentions that a response function model can be used to calculate and fit a 3D structure. But due to the multi-combined scattering pattern of 3D pattern is extremely complicated, it is difficult to construct 3D model before this. Especially for 3D nanostructures with advanced semiconductor process, the precision of wafer inspection parameters such as line width, line spacing, sidewall inclination angle, all require to reach 0.01 nm, so that it is needed to further improve the resolution of X-ray reflectometry.

SUMMARY

According to one embodiment, an X-ray reflectometry apparatus for measuring three dimensional nanostructures on a flat substrate is provided, including an X-ray source, an X-ray reflector, an incident slit, and an X-ray detector. The X-ray detector is preferably a 2 dimensional detector. The X-ray source is for emitting an X-ray with a wavelength larger than 0.154 nanometers (nm). The X-ray reflector is for point focusing a fan-shape X-ray onto a surface of a sample. The incident slit is between the X-ray reflector and the sample, the width of the incident slit is greater than its opening by a factor 10 or above, and the width of the incident slit is aligned perpendicular to the reflection plane of the X-ray. The X-ray detector has a fine pixel resolution for collecting the X-ray reflected by the surface of the sample, wherein the X-ray is point focused by the X-ray reflector onto the surface with an incident angle adjustable over a preset range. The divergence angle of the incident X-ray is controlled via the incident slit opening, and the divergence angle of the fan-shape incident X-ray is controlled via the width of the incident slit. At each azimuthal position of the reflected X-ray collected on the X-ray detector, the off-specular contribution is determined and removed from the reflected X-ray intensity.

According to another embodiment, a method for X-ray reflectometry (XRR) to measure three dimensional nanostructures on a flat substrate is provided. The method includes the following steps. A fan-shape X-ray is point focused onto a surface of a sample with an incident angle, wherein the incident angle is adjustable over a preset range of angle and a wavelength of the X-ray is larger than 0.154 nanometers (nm). The divergence angle of the incident X-ray is adjusted according to the incident slit opening when the incident angle is changed. The divergence angle of the fan-shape X-ray is adjusted via the width of the incident slit. The fan-shape reflected X-ray is collected by using an X-ray detector, and at each azimuthal position of the reflected X-ray collected on the X-ray detector the off-specular contribution is determined and removed from the reflected X-ray intensity. The specular component of the remained X-ray intensity at each azimuthal position is integrated to obtain the specular reflection intensity for each incident angle. The ratio between the specular reflection intensity and the integrated incident X-ray intensity is collected over a preset range of incident angle to obtain structure information of the sample.

According to an alternative embodiment, a method for X-ray reflectometry (XRR) to measure three dimensional nanostructures on a flat substrate is provided. The method includes the following steps. The specular reflection and off-specular reflection of a fan-shape X-ray is collected by using an X-ray detector. At each azimuthal position of the reflected X-ray collected on the X-ray detector, the off-specular contribution is determined and removed from the reflected X-ray intensity.

According to an embodiment of the present disclosure, an X-ray reflector for measuring a three-dimensional nano-structure on a flat substrate is provided, including an X-ray source, an X-ray reflector, a six-axis platform (Hexapod), an incident slit, an X-ray detector and a two-axis controller. The X-ray source is used to emit X-ray of one wavelength in a multi-wavelength range of 0.154 nm-20 nm. The X-ray reflector includes multiple mirrors or an X-ray monochromator. The six-axis platform is used to control the focus distance of multiple mirrors or X-ray monochromator ≥150 mm, so that X-ray is point focused on a sample surface from an incident angle ≥24° and the footprint size of the focused X-ray is ≤10 μm×25 μm. The focused X-ray can be controlled by a 2-axis controlled incident slit to change the divergence angle δθ, and the incident slit can be an aperture optical element or a slit element that can be controlled by an uniaxial piezoelectric; the X-ray detector is used to collect reflecting and scattering signals from the sample surface, which includes a 2-dimensional X-ray sensor inside a vacuum chamber and an analyzer outside the vacuum chamber. The size of the sensor can collect the scattering and reflecting signals completely. The two-axis controller is used to control the two-axis directions of the 2-dimensional X-ray sensor to move on z-axis with the incident angle of the X-ray for collecting the scattering and reflecting signals.

According to an embodiment of the present disclosure, a method for measuring a three-dimensional nanostructure on a flat substrate is provided, which includes the following steps. X-ray of one wavelength in a multi-wavelength range of 0.154 nm-20 nm is emitted. The focus distance of a X-ray reflector including multiple mirrors or X-ray monochromator ≥150 mm is controlled, so that the X-ray is point focused on a sample surface from an incident angle ≥24° and the footprint size of the focused X-ray is ≤10 μm×25 μm. The focused X-ray can be controlled by a 2-axis controlled incident slit to change the divergence anode δθ, and the incident slit can be an aperture optical element or a slit element that can be controlled by an uniaxial piezoelectric. Reflecting and scattering signals from the sample surface is collected by an X-ray detector, which includes a 2-dimensional X-ray sensor inside a vacuum chamber and an analyzer outside the vacuum chamber. The size of the sensor can collect the scattering and reflecting signals completely. The two-axis directions of the 2-dimensional X-ray sensor is controlled to move on z-axis with the incident angle of the X-ray for collecting scattering and reflecting signals.

Figure 1A:
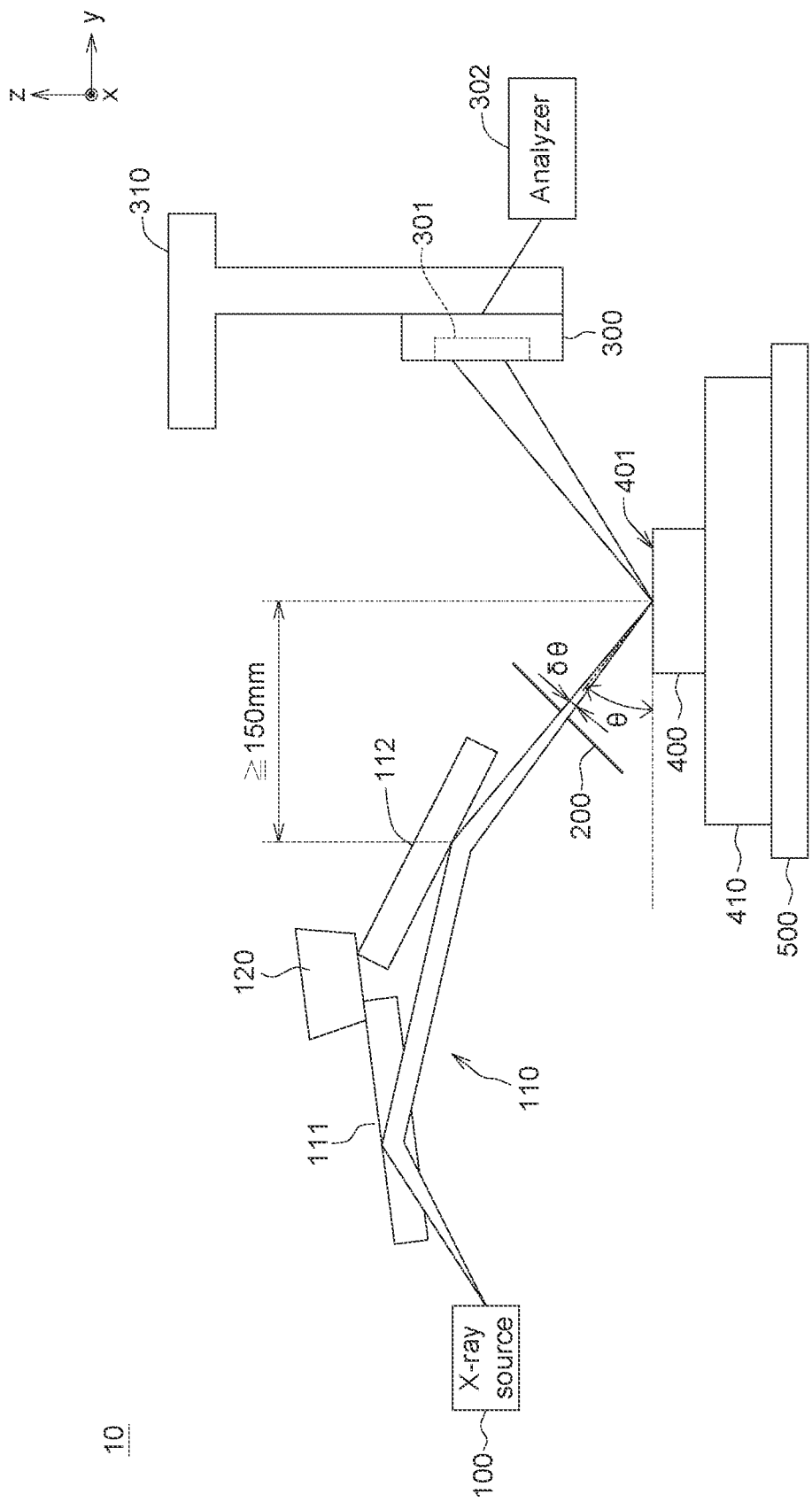
FIG. 1A shows an X-ray reflectometry apparatus according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Details are given in the non-limiting embodiments below. It should be noted that the embodiments are illustrative examples and are not to be construed as limitations to the claimed scope of the present disclosure. The same/similar denotations are used to represent the same/similar components in the description below. Directional terms such as above, below, left, right, front or back are used in the following embodiments to indicate the directions of the accompanying drawings, not for limiting the present invention.

The present disclosure relates generally to the measurement of characterization of three dimensional (3D) nanostructures on a flat substrate. More particularly, the present disclosure relates to an X-ray reflectometry applicable to samples with intricate 3D structures and a limited thickness or height, in the order of nanometers and concurrently with a limited sample area. In a previous invention (US patent 2016/0341674 A1) the challenge related to this minuscule sample volume, a product of thickness and area, has been addressed with a convergent XRR apparatus and method to enhance the incident beam flux, and hence improve the reflection signal strength. At the same time it maintains a desirable resolution in terms of the scattering vector Qz which is defined in its usual way as $(4\pi/\lambda)\sin\theta$, $\lambda$ stands for the wavelength of the X-ray and $\theta$ is the grazing incident angle between the sample surface and the incident X-ray. The angle $\theta$ is also the detection angle with respect to the sample surface since this previous invention is concerned only with the specular reflection. In this previous invention, convergent long wavelength X-ray is focused on the target area with a tightly controlled opening angle $\delta\theta$ while keeping the divergence angle along the azimuthal direction widely open to allow sufficient incident X-ray flux for conducting XRR with a miniscule sampling volume. The purpose of the present disclosure is to extend the above-mentioned XRR to measure 3D nanostructures supported on a flat substrate.

In one embodiment of the application, a method for XRR includes the steps of: point focusing an X-ray with a wavelength selected from 0.154 nm-20 nm onto a surface of a sample at a preset incident angle ≥24° and a preset focus distance 150 mm by using multiple set of reflect mirrors or a monochromator; adjusting the divergence angle of the X-ray to control the footprint size of the incident X-ray≤10 µm×25 µm on the sample surface and the angular resolution of the reflectivity while keeping a maximal allowable X-ray flux on the sample; and analyzing the XRR data to obtain the structure information of the sample.

In one embodiment, when a conventional X-ray reflectivity technique using a short wavelength X-ray less than 0.154 nm, the miniscule sample area and the larger footprint size of incident X-ray at low incident angle is mismatched. When a typical X-ray source with the wavelength in a range of 0.154-20 nm is used for the XRR measurements, and the incident angle $\theta$ of the X-ray is greater than 24°, the footprint size, denoted as p, on surface of the sample of incident X-ray beam is related to the beam size, denoted as f, by $p=f/\sin\theta$.

For applications in IC chip fabrication, a typical sample area is in the range of 25 µm×25 µm for advanced semiconductor process. It is therefore advantageous to use X-ray with long wavelength and a high incident angle $\theta$ such that the footprint size can be controlled under area of 10 µm×25 µm.

The wavelength dispersion is defined as $\delta\lambda/\lambda$, wherein $\lambda$ here refers to the wavelength of the X-ray emitted by the X-ray source, and $\delta\lambda$ here refers to the spread of the wavelength of the X-ray after being reflected by the X-ray reflector.

The resolution of the wave-vector q, denoted as $\delta q/q$, can be expressed as a sum of the X-ray wavelength uncertainty and angular uncertainty as shown in equation (1): $\delta q/q = \cos\theta * \delta\theta/\sin\theta + \delta\lambda/\lambda$.

It is shown that the resolution $\delta q/q$ is a function of the incident angle $\theta$, the divergence angle $\delta\theta$, and the wavelength dispersion $\delta\lambda/\lambda$. The above equation indicates that to achieve a constant resolution $\delta q/q$, i.e. $\delta q/q=c$, the incident angle $\theta$ and the divergence angle $\delta\theta$ of the X-ray will be changed accordingly.

It is should be noted that high incident flux and small footprint are the two major benefits by using a long wavelength X-ray source. There is an additional intrinsic benefit in applying long wavelength X-ray for XRR. That is, the integrated XRR intensity of any scattering peak is scaling linearly with $\lambda$. For a 3D object, its integrated scattering intensity is known to scale as $\lambda^3$. The XRR measurement is along the axis perpendicular to the flat substrate, hence, it is a one-dimensional measurement, and the integrated intensity is scaled as $\lambda$.

Figure 1B:
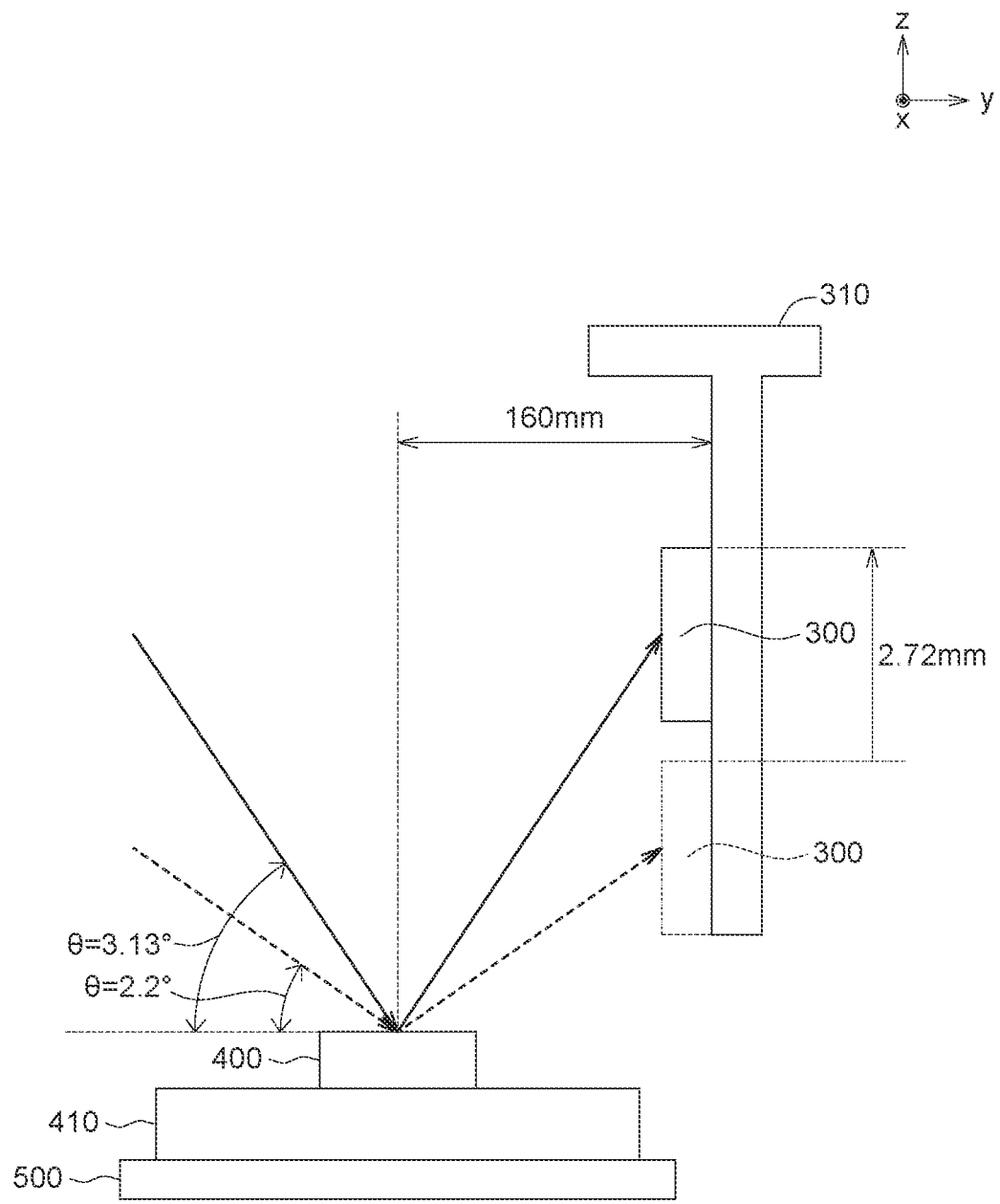
FIG. 1B shows an X-ray reflectometry apparatus which moves on z-axis with the incident angle for collecting scattering and reflecting signals according to an embodiment of the disclosure.
Figure 1C:
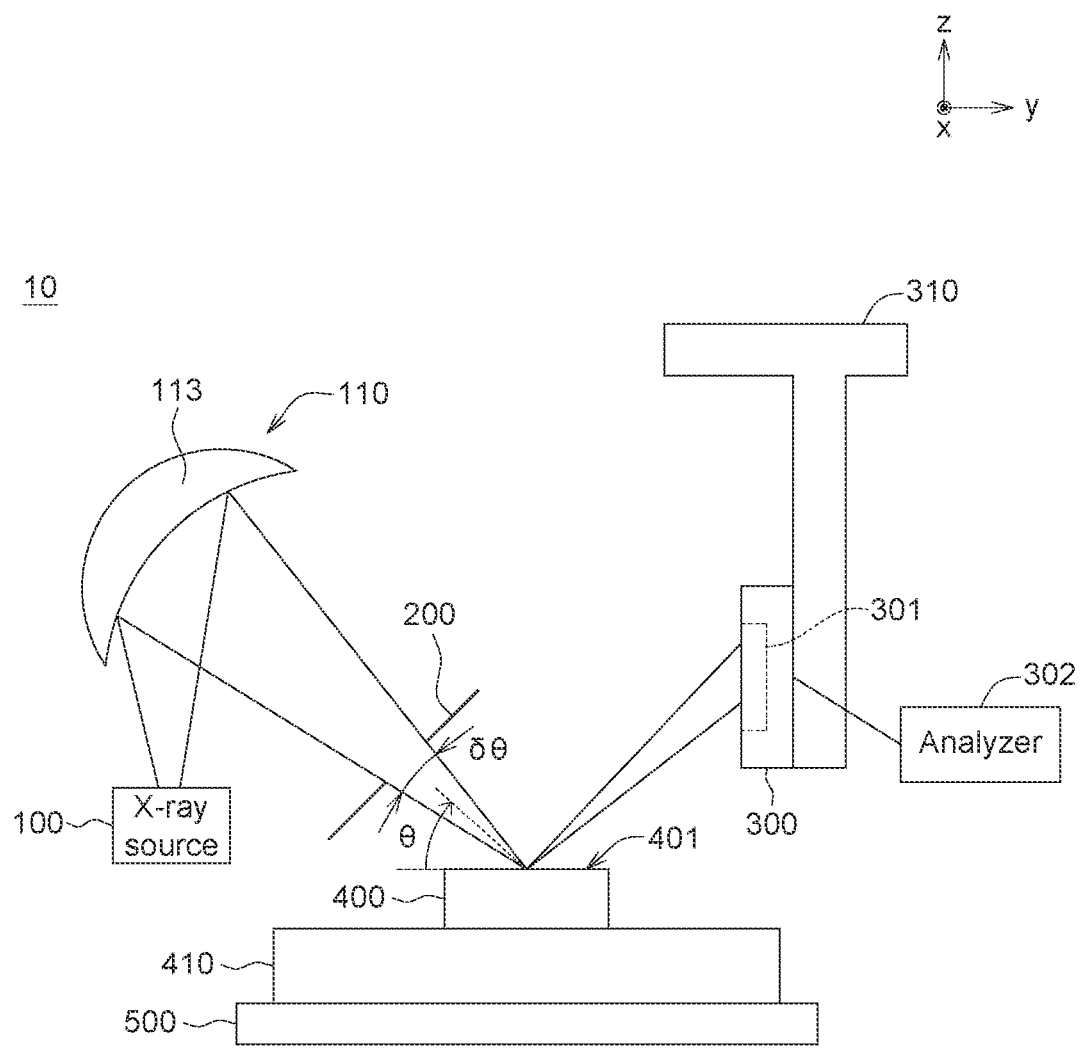
FIG. 1C shows an X-ray reflectometry apparatus according to another embodiment of the disclosure.
Figure 1D:
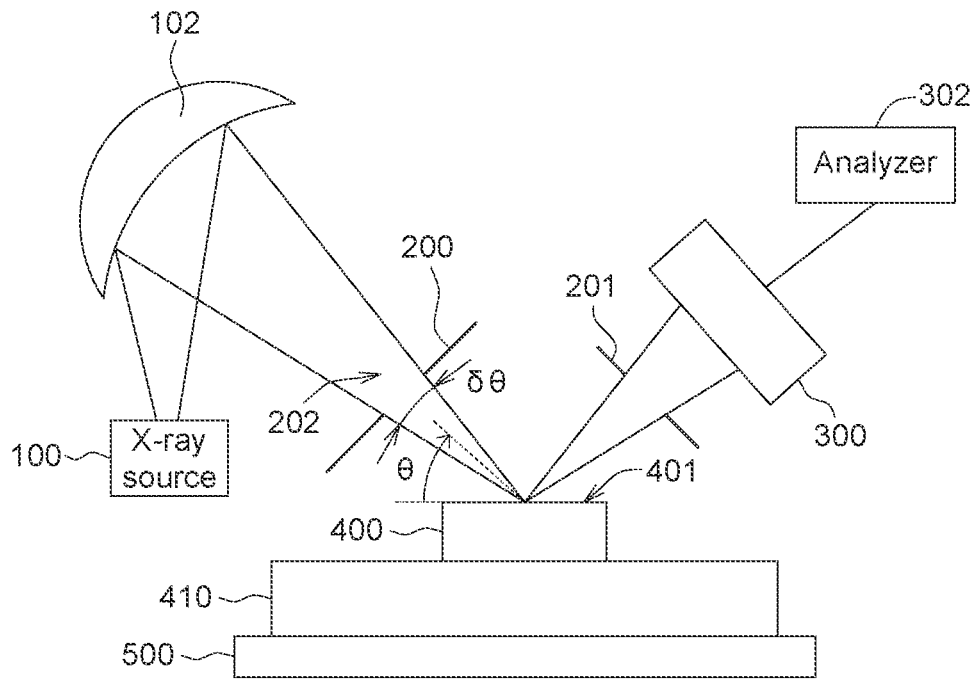
FIG. 1D shows an X-ray reflectometry apparatus according to another embodiment of the disclosure.

Please refer to FIGS. 1A to 1C, which illustrate a schematic diagram of an X-ray reflectometry apparatus 10 according to an embodiment of the present disclosure. The X-ray reflectometry apparatus 10 may include an X-ray source 100, an X-ray reflector 110, a six-axis platform (Hexapod) 120, an incident slit 200, an X-ray detector 300, an analyzer 302, and a two-axis controller 310. The X-ray source 100 is used to emit X-ray of one wavelength in a multi-wavelength range of 0.154 nm-20 nm. The X-ray reflector 110 includes multiple sets of mirrors 111, 112 (see FIG. 1A) or X-ray monochromator 113 (see FIG. 10). The six-axis platform 120 is used to control the focusing distance of multiple sets of mirrors 111, 112 or X-ray monochromator 113 ≥150 mm, so that X-rays are incident from an incident angle ≥24° and focused on a sample surface, and the footprint size of the incident X-ray ≤1 µm×25 µm. The focused X-ray can be controlled by a 2-axis controlled incident slit 200 to change the divergence angle $\delta\theta$. The X-ray detector 300 collects the reflecting and scattering signals, which includes a 2-dimensional X-ray sensor 301 in a vacuum chamber and an analyzer 302 outside the vacuum chamber, and the sensor size of the sensor 301 can collect the scattering and reflecting signals completely. The two-axis controller 310 is used to control the two-axis directions of the 2-dimensional X-ray sensor 310 to move on the z-axis with the incident angle of the X-ray for collecting scattering and reflecting signals.

In one embodiment, the scattering and reflecting signals of different 3D nanostructures correspond to different initial incident sensitivity angles, and the sensitivity angle range is, for example, ≥10°. The sensitivity angle is defined as the incident angle at which the reflection signal of the CD-XRR integrated light intensity with largest change ratio when the sample surface has a critical dimension change of several nanometers (for example, 10 nm). For example, within a predetermined range of incident angle $\theta$, collect the above-mentioned reflection signal and the total intensity of the incident light, and select with the largest change ratio between the reflection signal and the total intensity of the incident light to obtain the sensitivity angle range.

Please refer to FIG. 1B. In one embodiment, the X-ray with a long wavelength of 0.834 nm is used to measure a two-layer grating nanostructure of two-dimensional array. The line width of the nanostructure is 80 nm and the line pitch of nanostructure is 200 nm, for example. The sensitivity angle obtained by the simulation is 2.2°-3.13° so the incident angle between the incident X-ray and the 12-inch wafer is measured from 2.2° to 3.13°. The maximum opening angle $\delta\theta$ of the incident slit 200 has a minimum value of 0.2° according to the simulation, and the divergence angle $\delta\theta$ is the angle at which the periodic peaks of the reflection signal while keeping allowable. The two-dimensional sensor 301 on z-axis is adjusted with the incident angle $\theta$. For example, the size of the two-dimensional sensor 301 is 60 mm×60 mm, and the distance between the sensor 301 and the center of the sample is adjusted to 160 mm through the X-axis direction. According to the calculation of triangle geometry to make the reflection signal on the center of the sensor 301, when the incident angle $\theta$ rotates from 2.2° to 3.13° the z-axis of the sensor 301 needs to move up by 2.72 mm.

In an embodiment, the mirror set 111 and 112 may include X-ray collimators, refractive X-ray optical elements, diffractive optics, Schwarzschild optics, Kirkpatrick-Baez optics, Montel optics, Wolter optics or mirror X-ray optical elements, etc., the mirror set 111 and 112 can be used as ellipsoidal mirrors, multi-capillary optical mirrors, multi-layer optical mirrors or optical system. The 6-axis controller 120 can move to control the x, y, z moving axes and ω, φ, θ rotation axes of the mirror set 111 and 112 at the same time, so that the X-ray can focus on a sample surface 401 of 12-inch wafer; each mirror can be controlled with 2 axes, such as a rotation axis and a moving axis for optical focus.

Please refer to FIG. 10, in one embodiment, the X-ray reflector 110 is, for example, a monochromator 113, and a diameter of the Rowland circle of the monochromator 113 is, for example, ≥500 mm. In addition, the incident slit 200 can be an aperture optical element or a slit element that can be controlled by a uniaxial piezoelectric. In addition, the focus distance (i.e., 150 mm) of the X-ray reflector 110 is the minimum distance for the flat substrate 410 such as 12-inch wafer to avoid interference with the mirror set 111 and 112 or the monochromator 113 when the flat substrate 410 rotates.

When the wavelength dispersion $\delta\lambda/\lambda$ is changed, the incident angle θ and the divergence angle δθ of the X-ray will be changed accordingly. For example, given that $\delta\lambda$=0.68 nm, when the wavelength λ of X-ray is 0.834 nm, then $\delta\lambda/\lambda$=0.68/0.834=0.815. When the wavelength λ of X-ray is 0.154 nm, then $\delta\lambda/\lambda$=0.68/0.154=4.416. Since X-ray with different wavelengths are used, the maximum divergence angles at which the periodic peaks of the reflection signal while keeping allowable are also different. Taking the sample 400 with 12 nm $SiO_2$ film as an example, the maximum divergence angle δθ with a wavelength of 0.834 nm is 0.2°, and the maximum divergence angle δθ with a wavelength of 0.154 nm is 0.1°, so that when the incident angle θ changes, the maximum divergence angle δθ will be also changed accordingly.

The essence of the present disclosure is to use a 2D detector to collect the specularly reflected and the off-specular or scattered X-ray during the reflectivity run and the off-specular contributions resulted from finite coherence length and finite lateral Qx and Qy will be determined and removed to obtain the specular reflection intensity.

In applying XRR for nanostructured surface analysis, it is noteworthy that all the information available are along the thickness direction (z-axis given in the drawing); at a given depth the structural result deduced from XRR represents that from the lateral average over the coherence length. To obtain 3D information of the nanostructure from XRR additional input on a characteristic lateral length is needed. Such a length scale can be obtained from a single transmission small angle X-ray scattering (tSAXS) measurement at normal incidence. It is therefore advisable to have tSAXS data taken at normal incidence available together with the XRR data from the sample of interest.

For 3D array of nanostructures the azimuthal placement of the samples can no longer takes advantage of the large projected coherence length along the y axis. In addition, in the convergent beam of XRR scheme depicted in this disclosure, the scattering magnitude of Qx and Qy from the angular width of the incident slit and the detector slit projected on the sample surface or the x-y surface. For simplicity, the openings for both incident and the scattering slits are chosen to be identical and denoted as Φ as shown in FIG. 2B. From a straightforward geometrical consideration we have the ranges of Qx and Qy situated between $\pm 2\Phi(\pi/\lambda)$ cos θ and $\pm\Phi^2(\pi/\lambda)$ cos θ respectively.

Noting that Φ is given in rad and is typically less than unity, e.g. with Φ=0.26 or 15°, Qx has a range of ±0.52 (π/λ) cos θ while Qy has a range of ±0.068 (π/λ) cos θ. In most convergent beam XRR set-up the angular slit opening in dictated by the focus optics, 15° to 20° is a typical upper range available. This leads to the condition that Qx>Qy in most convergent XRR measurements. For thin film samples, there is no lateral structural variation, the existence of finite Qx, Qy and lateral coherence length imposes no restriction in the application of convergent XRR. For line grating sample, it is desirable to align the line with the x-axis to mitigate the impact of large Qx invoked in the XRR measurements. This alignment is also desirable from the lateral coherence length consideration since the coherence length is rather small along the x-axis. For the consequence of mis-aligning the line gratings, it is also visible from conventional XRR measurements using a highly collimated ribbon incident beam.

Even it is not the convergent incident beam discussed herein, all the discussions regarding coherence length and Qx, Qy are still valid since the only difference is the value of Φ is 15° to 25° in the current case and the value of Φ is about 1° or less for the case of the ribbon beam used in carrying out the work.

Figure 2A:
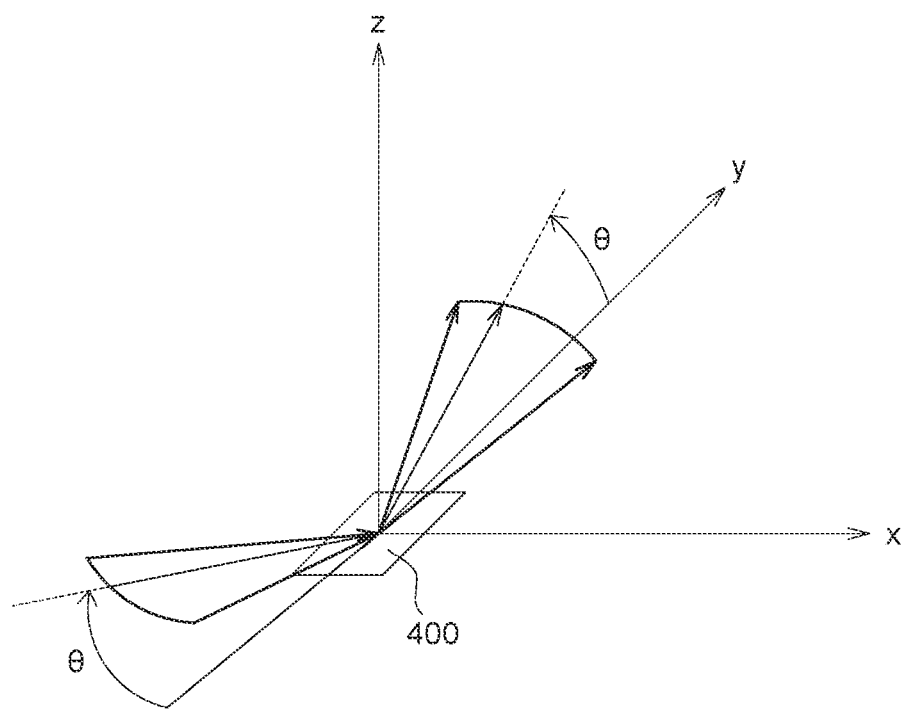
FIG. 2A shows a fan-shaped incident X-ray reflected on the sample.
Figure 2B:
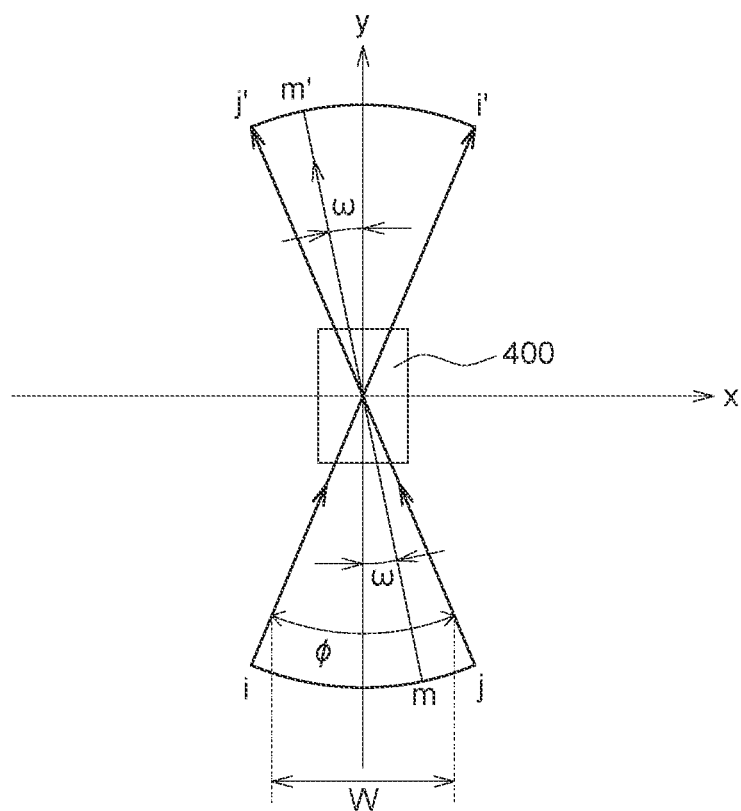
FIG. 2B shows a top-down view of FIG. 2A.

For 3D nanostructures samples often there is no obvious lateral orientation to align with respect to the convergent XRR axes such as x-axis or y-axis shown in FIG. 2A to mitigate the side effects due to finite coherence length and lateral scattering vectors Qx and Qy. The objective of the present disclosure is to mitigate the shortcomings in using convergent XRR method to measure 3D nanostructures on a flat substrate.

The present disclosure can solve this kind of problem on convergent XRR. Firstly, the method herein employs different incident angles θ which can analyze the depth information in the z direction of the sample. The focused light has integrated the xy information of the 3D sample with the reflectivity value. By analyzing the electron density along z direction correspond to the structural composition at different depths. Combining with known line widths or line space information, the 3D material composition and size can be resolved.

The problem to be solved is that the conventional methods for detecting critical dimensions in the art include atomic force microscope (AFM) and scanning electron microscope (SEM), but they encounter the problem in measuring critical dimensions. The present disclosure provides a method for detecting the critical dimensions of 3D nanostructures on a flat substrate by using convergent long-wavelength X-ray reflectometry. By fan-shaped focusing, the light intensity can be effectively increased, the detection area can be reduced, and the signals along different azimuthal directions can be received at the same time. The integrated incident X-ray intensity is collected at each azimuthal angle to obtain the thickness and density information of the sample through EMA approximation. The depth map is analyzed with the electron density along z direction to detect the pattern thickness, the line width, the line spacing changes in high precision level and has high resolution (less than 0.1 nm).

Referring to FIG. 1, an X-ray reflectometry apparatus 10 for measuring three dimensional nanostructures on a flat substrate according to an embodiment of the disclosure is provided, including an X-ray source 100, an X-ray reflector 102, an incident slit 200, a detector slit 201, an X-ray detector 300 and at least one analyzer 302. The X-ray source 100 is for emitting an X-ray with a wavelength larger than 0.154 nanometers (nm). The X-ray reflector 102 is for point focusing a fan-shape X-ray onto a surface 401 of a sample 400. The X-ray is point focused by the X-ray reflector 201 onto the surface 401 with an incident angle θ adjustable over a preset range. In an embodiment, the sample 400 is located on a flat substrate 410 and can be rotated 360 degrees by the sample stage 500. The flat substrate 410 is, for example, a semiconductor substrate.

The incident slit 200 is disposed between the X-ray reflector 102 and the sample 400, the width of the incident slit 200 is aligned perpendicular to the reflection plane of the X-ray, and the width of the incident slit 200 is greater than its opening 202 by a factor 10 or above, but the disclosure is not limited thereto. In an embodiment, the divergence angle δθ of the incident X-ray is controlled via the incident slit opening 202, and the divergence angle φ of the fan-shape incident X-ray is controlled via the width W of the incident slit 200. In addition, the detector slit 201 is disposed between the X-ray detector 300 and the sample 400 for controlling the divergence angle of the reflected X-ray.

In addition, the X-ray detector 300 has a fine pixel resolution for collecting the X-ray reflected by the surface 401 of the sample 400, and the X-ray detector is preferably a 2 dimensional detector. In an embodiment, at each azimuthal position ω of the reflected X-ray collected on the X-ray detector 300, the off-specular contribution is determined and removed from the reflected X-ray intensity. The light beam reflected from the surface 401 of the sample 400 can be regarded as a divergent light beam emitted by a new point light source. Therefore, the size of the light spot received by the X-ray detector 300 is related to the distance of the reflected light beam to the X-ray detector. The longer the distance the reflected beam travels, the larger the spot size received by the X-ray detector; conversely, the smaller the spot size received by the X-ray detector. The X-ray detector with fine resolution referred to in the disclosure means a detector with sufficient resolution capability for distinguishing one reflected light spot from another in a pixel; that is, as long as the size of the light spot falls within a pixel of the X-ray detector, and do not cross to the neighboring pixels of the pixel. Those with ordinary skill in the art should know that a detector with an appropriate resolution can be selected according to the distance of the reflected beam to the X-ray detector.

Referring to FIG. 2A, which shows a fan-shape incident X-ray reflected on the sample 400. The angle θ between the incident light and the xy plane is the same as the angle θ between the reflected light and the xy plane.

Referring to FIG. 2B, which shows a top-down view of FIG. 2A. The angle φ is a divergence angle of the incident light and the reflected light. The term i represents a beam specularly reflected by the sample to i'. Similarly, the term j represents a beam specularly reflected by the sample to j'. Another example in the figure is m-beam which has an angle ω relative to y-axis reflected by the sample to m', ij line and i'j' line can represent the incident light wavefront and the reflected light wavefront, respectively.

Figure 3:
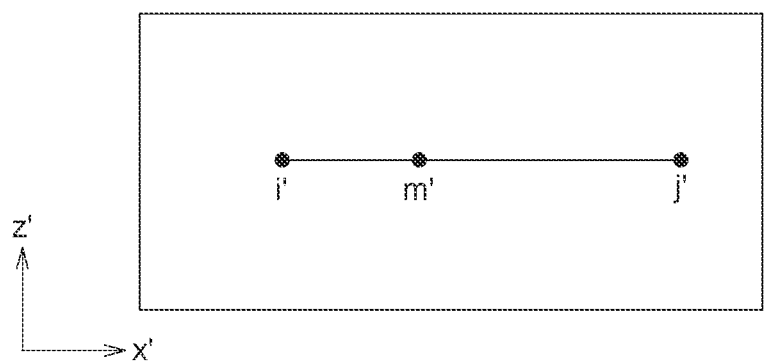
FIG. 3 illustrates the incident wavefront ij is specularly reflected on sample surface and the reflected wavefront recorded on a 2D detector as a line i'j'.

Referring to FIG. 3, which illustrates the incident wavefront ij is specularly reflected on sample surface and the reflected wavefront recorded on the 2D X-ray detector as a line i'j'. Each point m' on line i'j' represents a specularly reflection from point m on the incident wavefront at an azimuthal angle ω shown in FIG. 2B, The specular reflection line can be interpreted as aggregate of numerous specular reflection spots m'.

Figure 4A:
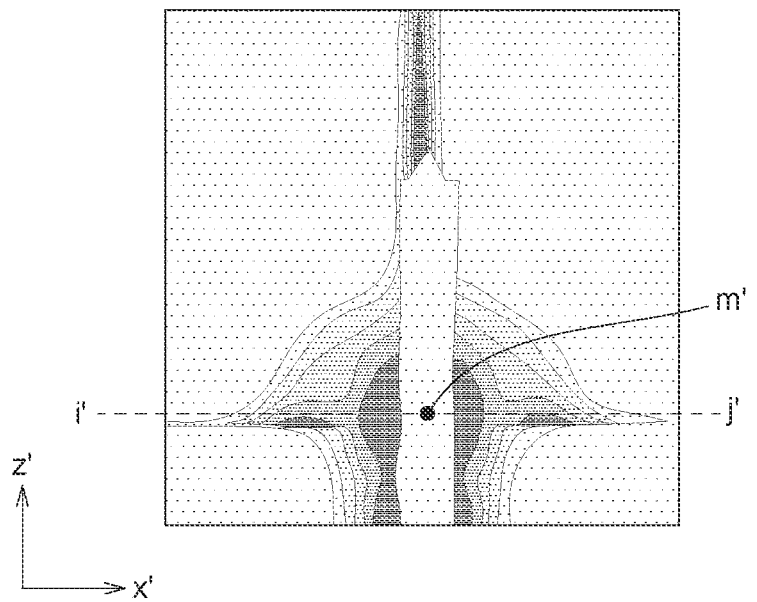
FIG. 4A illustrates a schematic diagram of 2D detector image from a 3D nanoporous thin film on a silicon substrate from a well collimated pencil incident beam.
Figure 4B:
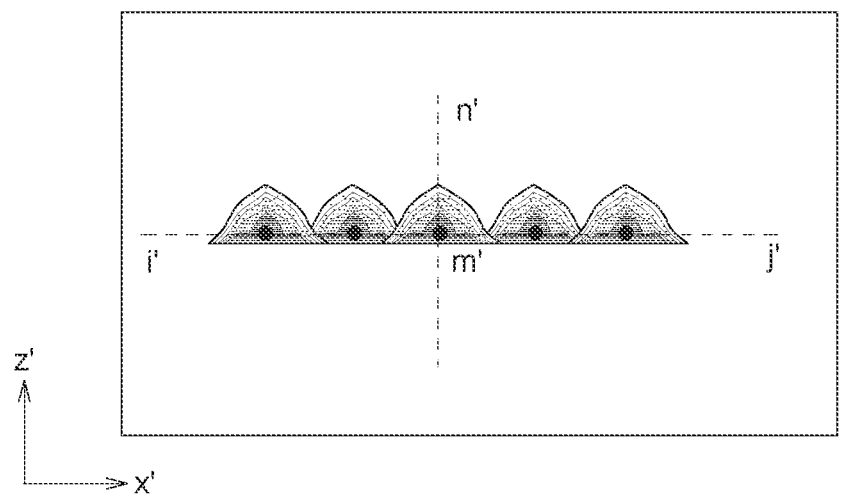
FIG. 4B shows a schematic diagram of 2D detector image from a 3D nanoporous thin film in FIG. 4A from a fan-shape incident X-ray shown in FIG. 2A.

FIG. 4A shows a representative 2D detector image from a 3D nanoporous thin film on a silicon substrate from a well collimated pencil incident beam. FIG. 4B shows a schematic view of 2D detector image from a 3D nanoporous thin film mentioned in FIG. 4A from a fan-shape incident beam shown in FIG. 2A.

Figure 4C:
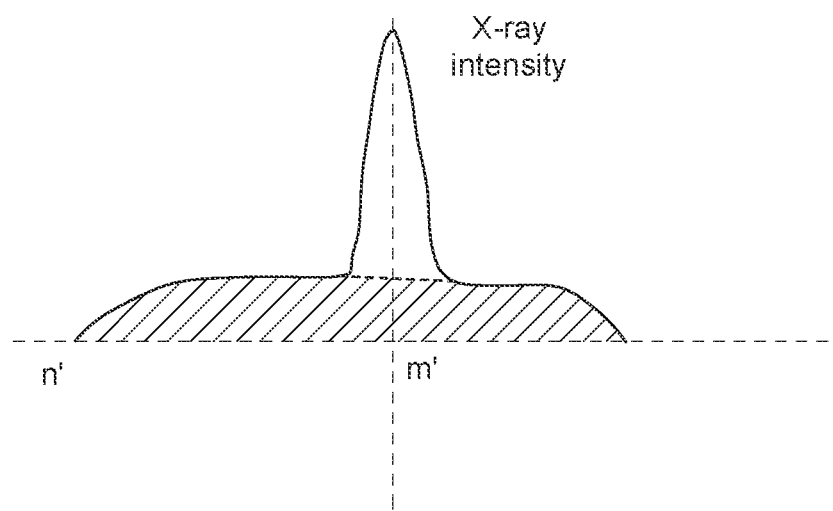
FIG. 4C shows a scattering intensity profile along line m'n' shown in FIG. 4B.

FIG. 4C shows a scattering intensity profile along line m'n' shown in FIG. 4B. The shade part represents the off-specular contribution and shall be removed from the intensity profile to obtain the specular part measure at an incident angle θ shown in FIG. 2A. Measuring the specular reflection intensities over a preset range of θ provides the reflectivity result.

Figure 5:
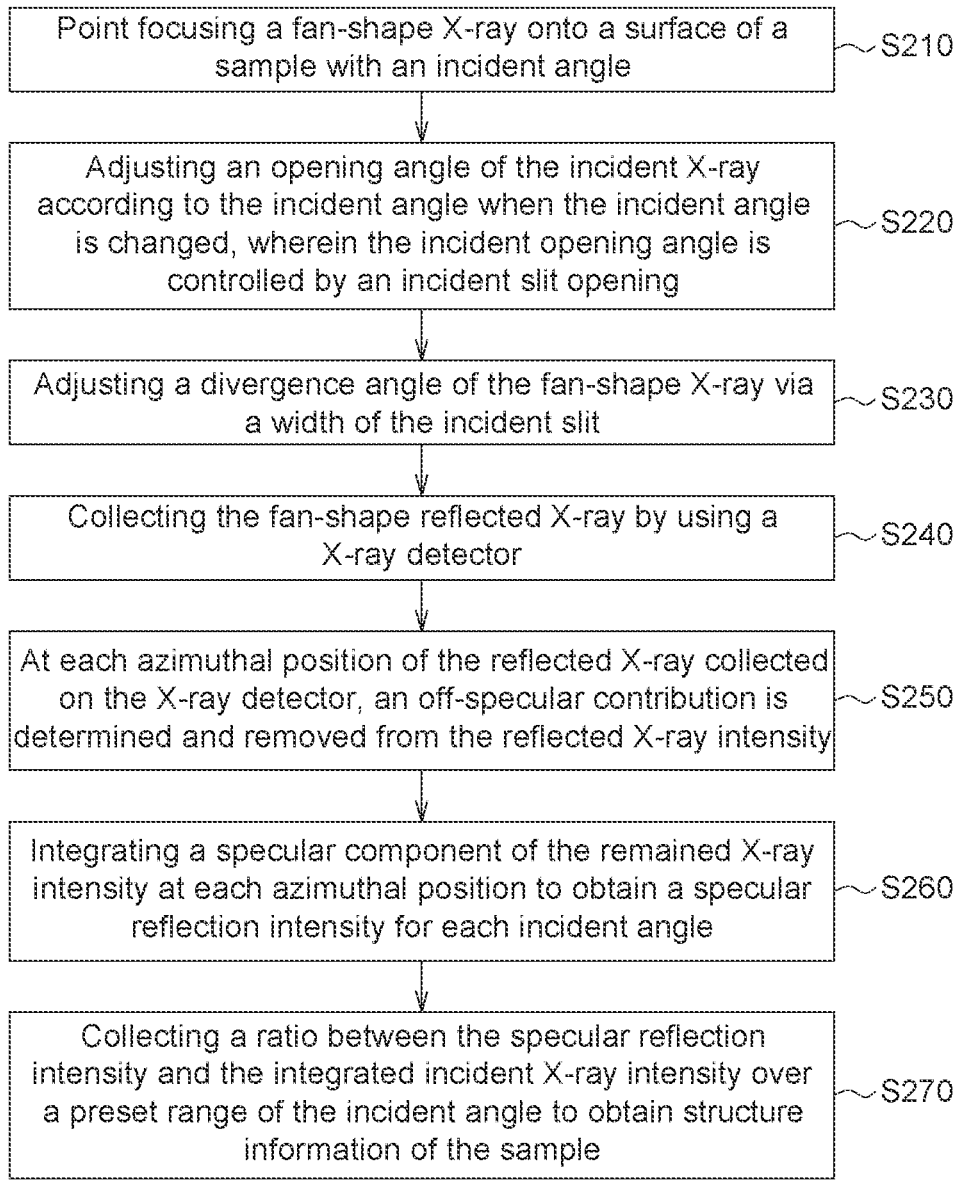
FIG. 5 shows a method for X-ray reflectometry according to an embodiment of the disclosure.

Referring to FIGS. 1 and 5, a method for X-ray reflectometry (XRR) apparatus 10 to measure three dimensional nanostructures on a flat substrate according to an embodiment of the disclosure is provided in FIG. 5. The method includes the following steps. In step S210, a fan-shape X-ray is point focused onto a surface 401 of a sample 400 with an incident angle θ, wherein the incident angle θ is adjustable over a preset range of angle and a wavelength of the X-ray is larger than 0.154 nanometers (nm). In step S220, the divergence angle δθ of the incident X-ray is adjusted according to the incident slit opening 202 when the incident angle θ is changed. The divergence angle δθ is, for example, a function of a tangent of the incident angle θ. In step S230, the divergence angle φ of the fan-shape X-ray is adjusted via the width W of the incident slit 200. In step S240, the fan-shape reflected X-ray is collected by using an X-ray detector 300 and in step S250, at each azimuthal position ω of the reflected X-ray collected on the X-ray detector 300, the off-specular contribution is determined and removed from the reflected X-ray intensity, as shown in FIG. 4C. In step S260, the specular component of the remained X-ray intensity at each azimuthal position ω is integrated to obtain the specular reflection intensity for each incident angle θ. In step S270, the ratio between the specular reflection intensity and the integrated incident X-ray intensity is collected over a preset range of incident angle θ to obtain structure information of the sample 400.

In an embodiment, the wavelength of the X-ray is no more than twice of a characteristic length along the surface normal of a structure of the sample 400.

In an embodiment, the characteristic length is selected from the group consisting of film thicknesses of the surface and heights of a nanostructure of the surface of the sample 400.

In an embodiment, the X-ray reflector 102 is selected from a group consisting of single crystal monochromators and multilayer mirrors. For a multilayer mirror type, the wavelength dispersion of the X-ray reflector 102 is less than 0.01.

In an embodiment, the divergence angle δθ is a function of the incident angle θ. That is, the divergence angle δθ can be changed with different incident angles θ.

In an embodiment, the divergence angle δθ is a function of a tangent of the incident angle θ multiplied by a constant K. (i.e., $\delta\theta = K^*\tan\theta$).

In an embodiment, the X-ray source includes a fine focused aluminum anode.

In an embodiment, the at least one analyzer 302 is for collecting an X-ray photoelectron spectrum (XPS) and/or an X-ray fluorescence (XRF) signals from the sample during the reflected X-ray is collected by the X-ray detector 300.

In the step S230, the sample stage 500 can be rotated over 360° around the surface normal of the sample 400 such that the XRR measurements can be conducted at different azimuthal angles ω between a given axial line (such as y-axis) assigned on the 3D nanostructures of the sample 400 and the reflection plane of the X-ray.

In the step S240, X-ray photoelectron spectrum (XPS) and X-ray fluorescence (XRF) signals can be collected concurrently during the XRR measurement, the combined XPS, XRF and XRR results will complement each other to enhance the accuracy in the analysis of surface structure information of the sample 400.

The focus beam in this disclosure is confined by a slit in the z direction which makes the divergence angle very small and less than or equal to 1 degree. In the x direction, there is a divergence angle of 15 to 25 degrees which create a multiple-angle scattering diagram in this direction. A line cut can be performed at each angle on the scattering diagram to obtain the intensity value of the specular point. Then the intensities of the angle range are all integrated to obtain the reflectivity of the incident angle. Further, in the present application, the focus beam is chopped in the z direction; the information of the depth in the z direction of the sample can be analyzed according to different incident angles.

According to the mentioned embodiments, an X-ray reflectometry apparatus and a method thereof for measuring three dimensional nanostructures on a flat substrate are provided by adjusting different incident angles θ, such that the critical dimensions of the sample in the z direction can be analyzed. Since the Qx and Qy signals integrates with the reflection signal Qz onto a surface of a sample, and only the light intensity in the Qz direction is taken, the analysis of critical dimensions in different depths can be successful by analyzing the electron density along the z direction vs. the depth map and combining with known line widths or line space information. In addition, the X-ray reflectometry apparatus of the present disclosure uses convergent long-wavelength X-rays, the wavelength of which is greater than a general commercial copper anode of 0.154 nm and less than twice of characteristic dimensions along the film thickness direction, and appropriate collimations on both incident and detection arms are provided to enable the XRR for measurements of samples with limited sample area and scattering volumes, such as a three-dimensional nanostructure sample on a flat substrate (i.e., a semiconductor substrate), to solve the problem of complex nanostructures along three coordinate directions being difficulty to measure by an X-ray reflectometry apparatus, and the complex nanostructures are such as rods or axis arrays with nanometer size.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An X-ray reflectometry apparatus for measuring a three-dimensional nanostructure on a flat substrate, comprising:
   an X-ray source for emitting an X-ray of one wavelength in a multi-wavelength range of 0.154 nm-20 nm;
   an X-ray reflector comprising multiple mirrors or a X-ray monochromator;
   a six-axis platform configured to control a focus distance of the X-ray reflector such that the focus distance is ≥150 mm, so that the X-ray is point focused on a sample surface from an incident angle ≥24° and a footprint of the focused X-ray is less than or equal to 10 μm×25 μm;
   an incident slit disposed between the X-ray reflector and the sample surface, wherein the focused X-ray is controlled by the incident slit to change a divergence angle, and the incident slit is an aperture optical element or a slit element that is controlled in at least one direction;
   an X-ray detector configured to collect reflecting and scattering signals from the sample surface, which includes a 2-dimensional X-ray sensor inside a vacuum chamber and an analyzer outside the vacuum chamber; and
   a controller configured to control the 2-dimensional X-ray sensor to move along a z-axis with the incident angle of the focused X-ray for collecting the scattering and reflecting signals.

2. The X-ray reflectometry apparatus according to claim 1, wherein the multiple mirrors are equal to or more than 2.

3. The X-ray reflectometry apparatus according to claim 1, wherein the multiple mirrors are used as ellipsoidal mirrors, multi-capillary optical mirrors, or multilayer optical mirrors.

4. The X-ray reflectometry apparatus according to claim 1, wherein a diameter of Rowland circle of the monochromator is equal to or more than 500 mm.

5. The X-ray reflectometry apparatus according to claim 1, wherein the three-dimensional nanostructure is a two-layer grating nanostructure or a multi-layer nanostructure, and a line width and a line pitch of the three-dimensional nanostructure are measured.

6. The X-ray reflectometry apparatus according to claim 1, wherein a sensitivity angle is defined as the incident angle at which a reflection signal of an integrated light intensity has a largest change ratio, wherein the largest change ratio occurs when the sample surface has a critical dimension change of several nanometers.

7. The X-ray reflectometry apparatus according to claim 6, wherein the sensitivity angle has a range equal to or more than 10°.

8. The X-ray reflectometry apparatus according to claim 1, wherein the divergence angle multiplied by the tangent of the incident angle is changed according to a wavelength dispersion $\delta\lambda/\lambda$, wherein $\lambda$ refers to the wavelength of the X-ray and $\delta\lambda$ refers to a spread of the wavelength of the X-ray after being reflected by the X-ray reflector.

9. A method for measuring a three-dimensional nanostructure on a flat substrate comprising:
   emitting an X-ray of one wavelength in a multi-wavelength range of 0.154 nm-20 nm;
   controlling a focus distance of an X-ray reflector including multiple minors or an X-ray monochromator such that the focus distance is ≥150 mm, so that the X-ray is point focused on a sample surface from an incident angle ≥24° and a footprint of the focused X-ray is less than or equal to 10 μm×25 μm;
   controlling the focused X-ray by an incident slit to change a divergence angle, and the incident slit is an aperture optical element or a slit element that is controlled in at least one direction;
   collecting reflecting and scattering signals from the sample surface by an X-ray detector, which includes a 2-dimensional X-ray sensor inside a vacuum chamber and an analyzer outside the vacuum chamber, and a size of the sensor collects the scattering and reflecting signals completely; and
   controlling the 2-dimensional X-ray sensor to move on a z-axis with the incident angle of the focused X-ray for collecting the scattering and reflecting signals.

10. The method according to claim 9, wherein the multiple mirrors are equal to or more than 2.

11. The method according to claim 9, wherein the multiple mirrors are used as ellipsoidal mirrors, multi-capillary optical mirrors, or multilayer optical mirrors.

12. The method according to claim 9, wherein a diameter of Rowland circle of the monochromator is equal to or more than 500 mm.

13. The method according to claim 9, wherein the three-dimensional nanostructure is a two-layer grating nanostructure, wherein a line width and a line pitch of the three-dimensional nanostructure are measured.

14. The method according to claim 9, wherein a sensitivity angle is defined as the incident angle at which a reflection signal of an integrated light intensity has a largest change ratio, wherein the largest change ratio occurs when the sample surface has a critical dimension change of several nanometers.

15. The method according to claim 14, wherein the sensitivity angle has a range equal to or more than 10°.

16. The method according to claim 9, wherein the divergence angle multiplied by the tangent of the incident angle is changed according to a wavelength dispersion $\delta\lambda/\lambda$, wherein $\lambda$, refers to the wavelength of the X-ray and $\delta\lambda$ refers to a spread of the wavelength of the X-ray after being reflected by the X-ray reflector.

* * * * *